United States Patent
Galelli Christmann et al.

(10) Patent No.: US 12,430,835 B2
(45) Date of Patent: Sep. 30, 2025

(54) ANIMATION PROCESSING METHOD BASED ON PHYSICAL CHARACTERISTICS

(71) Applicants: INVENTEC (PUDONG) TECHNOLOGY CORPORATION, Shanghai (CN); INVENTEC CORPORATION, Taipei (TW)

(72) Inventors: Guilherme Henrique Galelli Christmann, Taipei (TW); Ying-Sheng Luo, Taipei (TW); Wei-Chao Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 254 days.

(21) Appl. No.: 18/227,234

(22) Filed: Jul. 27, 2023

(65) Prior Publication Data

US 2024/0420402 A1    Dec. 19, 2024

(30) Foreign Application Priority Data

Jun. 19, 2023    (CN) .......................... 202310731949.8

(51) Int. Cl.
- *G06T 13/40* (2011.01)
- *A63F 13/57* (2014.01)
- *G06N 3/092* (2023.01)

(52) U.S. Cl.
CPC .............. *G06T 13/40* (2013.01); *A63F 13/57* (2014.09); *G06N 3/092* (2023.01)

(58) Field of Classification Search
CPC ..................... G06T 13/40; G06T 13/80; G06T 2207/20081; A63F 13/57; G06N 3/092
See application file for complete search history.

(56) References Cited

U.S. PATENT DOCUMENTS

| | | | |
|---|---|---|---|
| 2020/0293881 A1* | 9/2020 | Taylor | G06T 13/40 |
| 2021/0082170 A1* | 3/2021 | Chentanez | G06N 3/006 |

(Continued)

OTHER PUBLICATIONS

Kunze, Lars, Tobias Roehm, and Michael Beetz. "Towards semantic robot description languages." 2011 IEEE International Conference on Robotics and Automation. IEEE, May 9, 2011 (pp. 5589-5595). (Year: 2011).*

(Continued)

*Primary Examiner* — King Y Poon
*Assistant Examiner* — Vincent Peren
(74) *Attorney, Agent, or Firm* — Maschoff Brennan (57) ABSTRACT

An animation processing method performed a computing device includes: obtaining a character file configured to set a character in an animation, setting a plurality of keyframes in a plurality of frames of the animation, generating a motion file according to the character file and the plurality of keyframes, where the motion file is configured to specify motion information of the character for each frame, loading the character file into a simulator to create the character, and performing a training process based on deep reinforcement learning. The training process includes performing a plurality of actions by the character in an environment set by the simulator and collecting a plurality of data points when the character performs motions; and training a policy model according to the training dataset, where the policy model outputs one of the plurality of motions according to a state of the character and the motion information.

9 Claims, 5 Drawing Sheets

(56) References Cited

U.S. PATENT DOCUMENTS

2022/0198732 A1* 6/2022 Lin ........................... G06T 7/74
2024/0169636 A1* 5/2024 Yuan ....................... G06T 13/80

OTHER PUBLICATIONS

Backhouse, Daniel, Jonah Gourlay, Bereket Guta, Kevin Huang, and Kobe Ng. "Gym2real: An open-source platform for sim2real transfer." (2022). (Year: 2022).*

* cited by examiner

ANIMATION PROCESSING METHOD BASED ON PHYSICAL CHARACTERISTICS

CROSS-REFERENCE TO RELATED APPLICATIONS

This non-provisional application claims priority under 35 U.S.C. § 119(a) on Patent Application No(s). 202310731949.8 filed in China on Jun. 19, 2023, the entire contents of which are hereby incorporated by reference.

BACKGROUND

1. Technical Field

The present disclosure relates to character animation, particularly to an animation processing method that ensures the actions of characters in the animation adhere to the laws of physics.

2. Related Art

Character animation is vital in many industries, such as movies, games, and robot control. In the movie industry, it brings lively motions of the actor in a scene, which in turn requires the character animation to be crisp and high quality. In games, the responsiveness of the character movement plays a critical aspect in the immersive gameplay. In addition, animation can also be used as a reference for a control policy to imitate user-defined and data-driven behaviors.

To obtain high-quality animation clips, practitioners often resort to motion capture processes that require a sizeable investment in equipment. Another option is to author animation clips by hand, which requires substantial artistic experience and time investment. In both processes, failure to respect the character's physical limitations cause unrealistic movements, such as jerky motions, physically unfeasible actions, and clipping.

SUMMARY

In light of the above descriptions, the present disclosure provides an animation clip processing workflow that can embed physical limitations and properties of the character into a given animation clip. These physical properties include mass, gravity, ground friction, and contact interaction with other objects, among others.

According to one or more embodiment of the present disclosure, an animation processing method performed by a computing device includes: obtaining a character file, wherein the character file is configured to set a character in an animation; setting a plurality of keyframes in a plurality of frames of the animation; generating a motion file according to the character file and the plurality of keyframes, wherein the motion file is configured to specify motion information of the character for each of the plurality of frames; loading the character file into a simulator to create the character; and performing a training process based on deep reinforcement learning, wherein the training process comprises: performing a plurality of motions with the character in an environment set by the simulator and collecting a plurality of data points when the character performs the plurality of motions to create a training dataset; and training a policy model according to the training dataset, wherein the policy model outputs one of the plurality of motions according to a state of the character and the motion information.

In view of the above, the present disclosure enables an animation clip processing workflow that can produce physically accurate animation clips from inaccurate or coarse animation clip inputs. After processed, the animation clip follows the general behavior described in the original clip while respecting the character's and environment's physical properties, such as gravity, mass, and ground friction.

The aforementioned context of the present disclosure and the detailed description given herein below are used to demonstrate and explain the concept and the spirit of the present application and provides the further explanation of the claim of the present application.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

The present disclosure provides an animation processing method which includes a plurality of steps performed by a computing device. In an embodiment, the animation processing method proposed by the present disclosure is implemented with software or program executed on the computing device, and the computing device may adopt any of the following devices: Application Specific Integrated Circuit (ASIC), Digital Signal Processor (DSP), Field Programmable Gate Array (FPGA), System-on-a-Chip (SoC), deep learning accelerator, or any other suitable computing device. However, the present disclosure is not limited in these examples.

Figure 1:
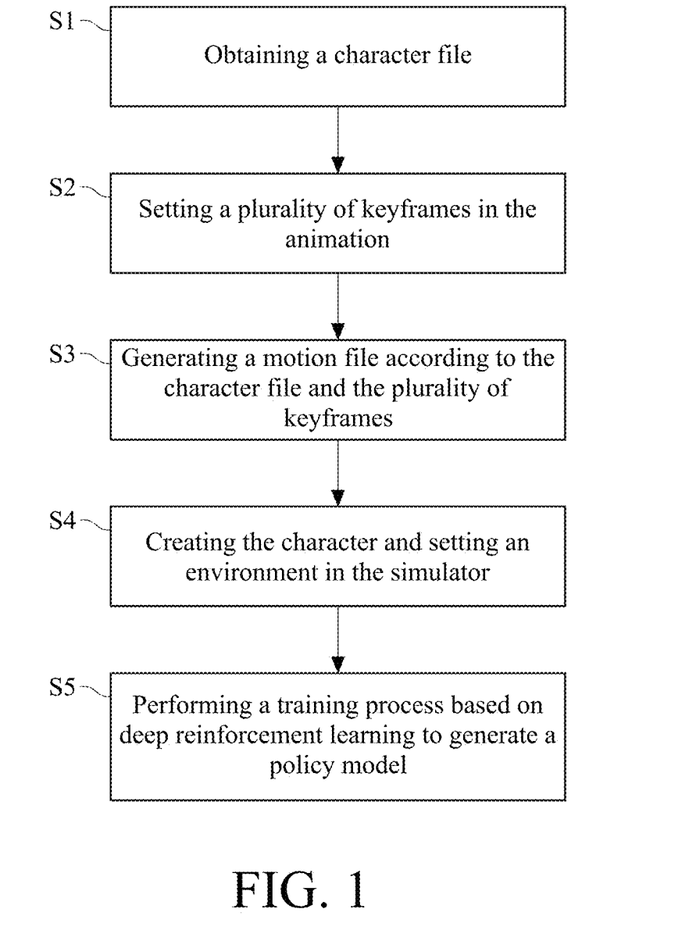
FIG. 1 is a flowchart of an animation processing method according to an embodiment of the present disclosure.

FIG. 1 is a flowchart of the animation processing method according to an embodiment of the present disclosure. As shown in FIG. 1, in step S1, a character file is obtained. The character file is configured to set a character, such as a human or a quadruped animal, in the animation. A character consists of multiple revolution joints and connections between these joints, but the present disclosure does not limit the number of joints of a character. In an embodiment, the character file is unified robot description format (URDF). The character file describes the anatomical structure of the character, denotes the hierarchical relation between every link and joint, including their physical specifications and constraints. Examples of physical specifications include joint mass, joint type, and motor position. Examples of constraints include the minimum/maximum rotation angle of a joint.

In step S2, the keyframes of the animation are set. This step is equivalent to specifying the character's key pose at certain time points. The animation consists of multiple frames, and at least two of these frames are set as keyframes. The present disclosure does not limit the maximum number of keyframes. In an embodiment, the character file and keyframes are set by the user through an interface provided by software or programs.

In step S3, a motion file is generated according to the character file and keyframes. In an embodiment, step S3 is implemented by an animation editor software that takes the character file as input. For example, the range of rotation angles for each joint are imported into the software as control terms, where the number of control terms corresponds to the number of joints. Step S3 is used to create a coarse animation clip where the character performs the target actions specified by the user, such as jumping in place. The motion file is used to specify the motion information of the character for each frame of the animation.

Figure 2:
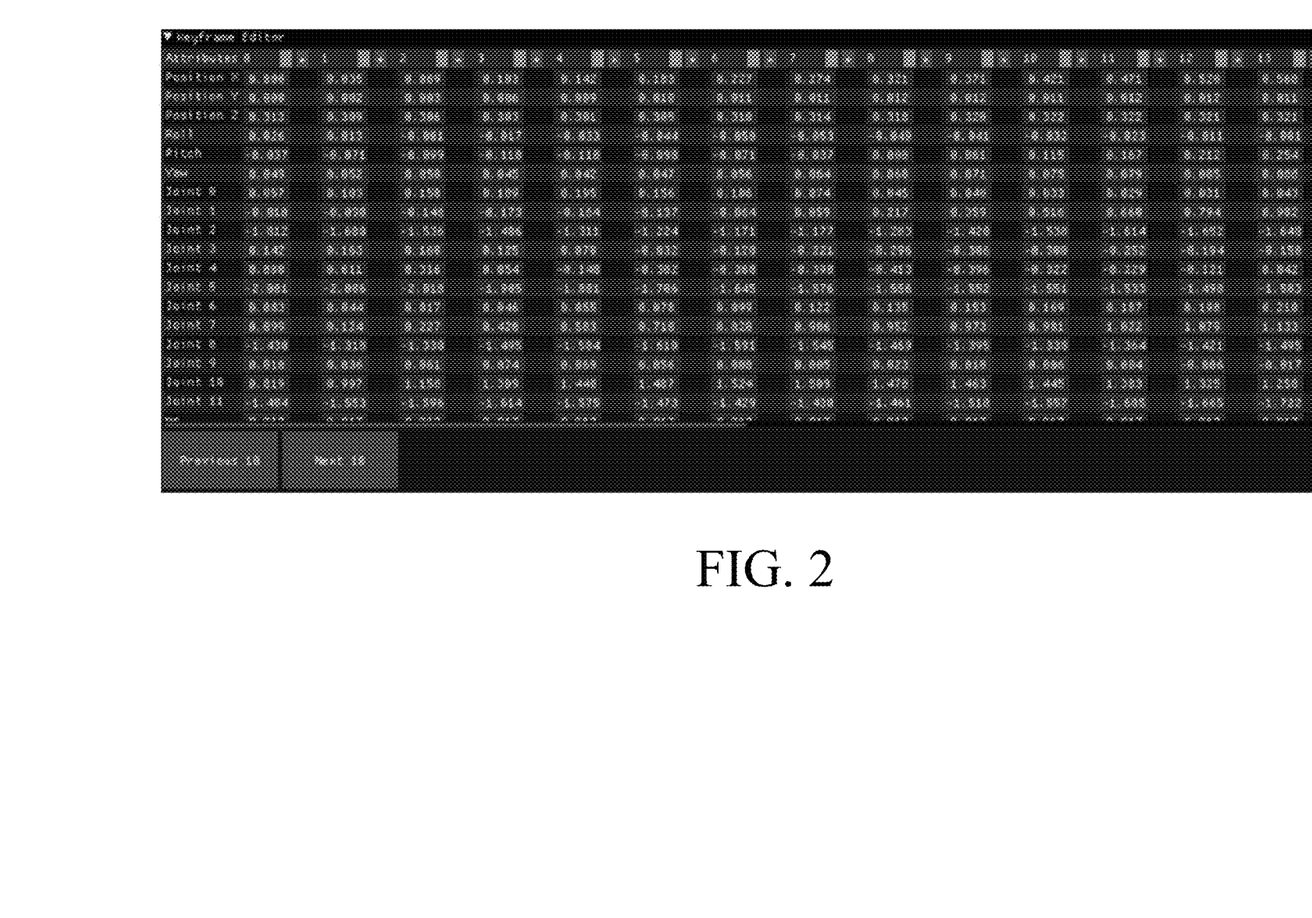
FIG. 2 is an example of the content of a motion file.

In an embodiment, the motion information includes a rotation angle of each joint of the character, a three-dimensional coordinates of a center of mass (COM) of the character, and a three-axis angle of the COM. FIG. 2 is an example of the content of the motion file. As shown in FIG. 2, each row (from Attribute 0 to 13) denotes a frame in the animation. Each row contains multiple motion information, where Positions X/Y/Z denote the spatial coordinates of the character's COM, and Roll/Pitch/Yaw refer to the three-axis angles of the COM. Joints 0 to 11 denote the rotation angles of the joints.

Figure 3:
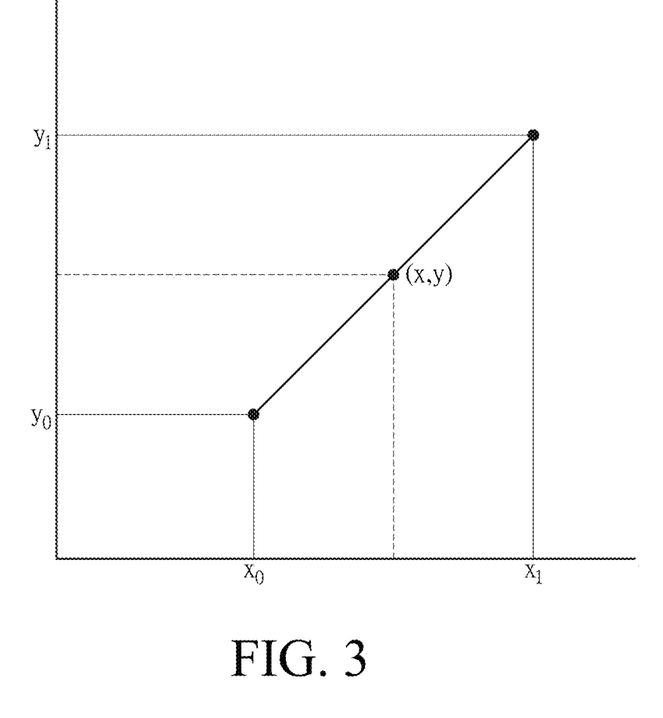
FIG. 3 is a schematic diagram of an example of linear interpolation.

In an embodiment, the motion file may be generated using linear interpolation according to the character file and at least two keyframes. FIG. 3 is a schematic diagram of an example of linear interpolation. As shown in FIG. 3, the horizontal axis denotes time, and the vertical axis denotes the rotation angle of a joint. The points $(x_0, y_0)$ and $(x_1, y_1)$ denote the starting and ending keyframes of a motion, respectively. Specifically, $x_0$ denotes the starting time, $x_1$ denotes the ending time, $y_0$ denotes the starting rotation angle, and $y_1$ denotes the ending rotation angle. Given the current time x, the corresponding rotation angle y at that time may be calculated by the linear equation $$y = y_0 * \left(1 - \frac{x - x_0}{x_1 - x_0}\right) + y_1 * \frac{x - x_0}{x_1 - x_0}.$$

In addition to using linear interpolation to generate the motion file before editing the motion, in other embodiments, the motions between these keyframes may be manually set by the user or extracted from videos using pose estimation models.

The coarse animation clip generated according to the flow from step S1 to step S3 may respect the limit of each joint defined in the character file. However, the character is not subject to any physical interaction constraints, which may result in unnatural motions or violations of physical properties. The animation processing method proposed in the present disclosure employs a post-processing procedure called imitation learning to correct the character's motions, as described below.

Please refer to FIG. 1. In step S4, the character is created and the environment is set in the simulator. In an embodiment, the character file is loaded into the Isaac Gym simulator to create the character. In addition, the environment in which the character exists needs to be set in the simulator to facilitate the interaction between the character and the environment. In an embodiment, the environment parameters set in the simulator include gravity, ground friction, and external disturbances (such as external forces, uneven terrains, and noise). During the interaction process, the character's motions are influenced by the environment parameters and the mass of each joint defined in the character file.

Figure 4:
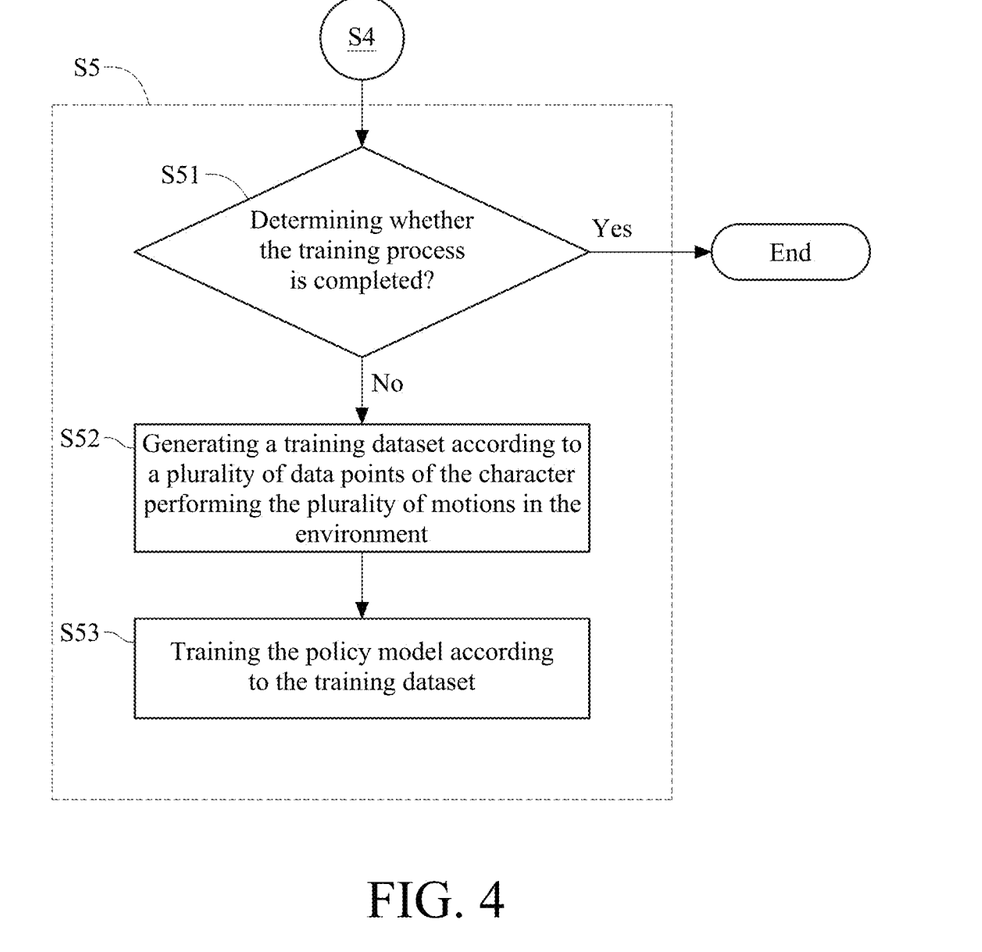
FIG. 4 is a detailed flowchart of the training process.

In step S5, a training process is performed based on deep reinforcement learning (DRL) to generate a policy model. In this process, the character is placed in an environment that adheres to laws of physics and is influenced by factors such as gravity, ground friction, the mass of joints, and other external disturbances. Through deep reinforcement learning, a policy model is trained. FIG. 4 is a detailed flowchart of the training process, including steps S51 to S53.

Step S51 determines whether the training process is completed. In an embodiment, if the number of iterations of the training process exceeds a user-defined threshold, it indicates that the training process is completed and should be terminated. Conversely, if the number of iterations does not exceed this threshold, it indicates that the training process is not yet completed, and step S52 is performed next.

In step S52, a training dataset is created according to a plurality of data points of the character performing various motions in the environment. In step S52, the character interacts in the environment that adheres to laws of physics, and the simulator collects a plurality of states of the character during the aforementioned process, along with the desired target states and the rewards obtained by the character for performing motions, these data points are collected as training data. Further details are provided below.

Figure 5:
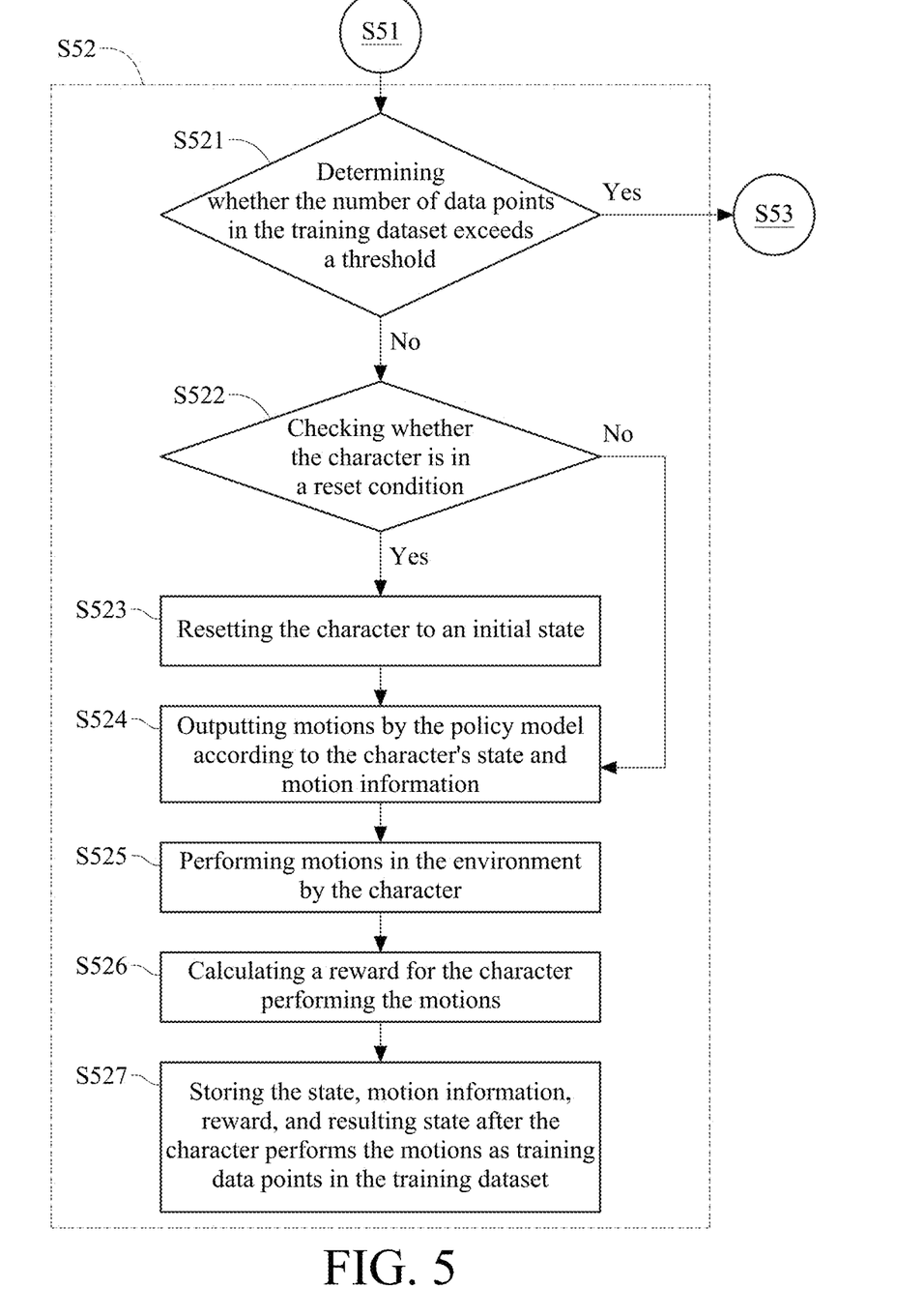
FIG. 5 is a detailed flowchart of a step in FIG. 4.

FIG. 5 is a detailed flowchart of step S52, including steps S521 to S527.

Step S521 determines whether the number of data points in the training dataset exceeds a threshold. The training dataset includes a plurality of training data points. Step S53 is performed if the number of training data points exceeds the threshold. Otherwise, the process after step S522 is performed to generate more training data points. In an embodiment, the threshold value is determined according to other hyperparameters such as batch size, number of batches, and maximum episode length.

The maximum episode length is a parameter used in deep reinforcement learning to quantify the performance of the character. Each time the character performs a motion, it counts as one episode. The setting of the maximum episode length depends on the training target. Since the goal of the present disclosure is to let a physically compliant character imitate the motions specified in the motion files through imitation learning, the setting of the maximum episode length is at least equal to the duration of the animation specified in the motion files. In another embodiment, the setting of the maximum episode length is 2 to 3 times the duration of the animation. By increasing the difficulty of the character training (more episodes imply that the character needs to survive for a longer time), the learning results of the character become more stable.

In step S522, checking whether the character is in a reset condition when the number of data points does not exceed the threshold. In an embodiment, the reset condition includes the character falling in the environment (e.g., the character's back touching the ground) or the number of motions exceeding a predetermined value. If the character is in a reset condition step S523 is performed to reset the character to an initial state. Otherwise, step S524 is performed to generate motions by the policy model according to the character's state and motion information. In an embodiment, the reset items in step S523 include the position, rotation angles, linear velocity, and angular velocity of the center of mass; the position, rotation angles, linear velocity, and angular velocity of the joints; the episode counter (used to track the current episode count); a reference motion index (record the frame number of the current motion); and a history buffer (a register used to store a plurality of past motions).

In an embodiment, the policy model may adopt a feedforward neural network. Given the character's current state $s_t$ and motion information $g_t$ as input, the policy model w outputs the character's motion at (rotation angles of each joint), denoted as $\pi(a_t|s_t,g_t)$, where t denotes the time step.

The current state $s_t$ is the character state simulated by the simulator. The motion information $g_t$ is obtained from the motion file. In an embodiment, the current state $s_t$ includes joint angles, orientation, angular velocity, a binary indicator of whether the character is in contact with the ground, and the history of M past motions. The motion information is selected from a consecutive N frames in the motion file. The values of M and N are not limited in the present disclosure.

In step S525, the character performs motions in the environment set by the simulator. In step S526, a reward is calculated for the character performing the motions. In an embodiment, the reward includes multiple error terms between the initial state and a target state. These error terms include a joint position, a joint velocity, an end-effector position, a position and a linear velocity of the COM, and an orientation and angular velocity of the COM. In step S527, the state, motion information, reward, and the resulting state after the character performs the motions are stored as training data points in the training dataset. A training data point may be denoted as $(s_t,r_t,a_t,done)$, where $s_t$ denotes the current state of the character, $r_t$ denotes the reward, at denotes the motion, and done denotes the resulting state (done=1 for termination, done=0 for ongoing, and the value of done is set to 1 if the maximum episode length exceeds a threshold). In addition, t represents the time step.

Please refer to FIG. 4. In step S53, the policy model is trained according to the training dataset. In an embodiment, the Proximal Policy Optimization (PPO) algorithm is used to design the loss function and perform the calculation of gradient descent. As described in step S526, the learning signal for training the policy model consists of five different components, which measure the differences between the motions of the physically plausible character and the user-defined character motions. The goal of training in step S53 is to minimize the differences in posture, joint velocities, end-effector positions, COM positions, and COM velocities between the character and the motion file.

Overall, the result of the imitation learning process is the policy model. During training, the policy model aims to mimic the specified motions from the motion file while still adhering to the physical constraints defined by the environment. By sampling motions from the policy, refined actions may be played back. When deployed in an environment with physics simulation, such as in 3D animation and games, the character with refined motions can interact with the environment and respond to environmental changes in a realistic manner.

In view of the above, the present disclosure provides a processing flow for animation clips that can generate physically accurate animation clips from inaccurate or coarse input animation clips. After processing, the animation clips adhere to the general behavior described in the original clips while respecting the physical characteristics of the character and the environment, such as gravity, mass, and ground friction.

Although embodiments of the present application are disclosed as described above, they are not intended to limit the present application, and a person having ordinary skill in the art, without departing from the spirit and scope of the present application, can make some changes in the shape, structure, feature and spirit described in the scope of the present application. Therefore, the scope of the present application shall be determined by the scope of the claims.

What is claimed is:

1. An animation processing method performed by a computing device comprising:
    obtaining a character file, wherein the character file is configured to set a character in an animation;
    setting a plurality of keyframes in a plurality of frames of the animation;
    generating a motion file according to the character file and the plurality of keyframes, wherein the motion file is configured to specify motion information of the character for each of the plurality of frames;
    loading the character file into a simulator to create the character; and
    performing a training process based on deep reinforcement learning, wherein the training process comprises:
        performing a plurality of motions with the character in an environment set by the simulator and collecting a plurality of data points when the character performs the plurality of motions to create a training dataset; and
        training a policy model according to the training dataset, wherein the policy model outputs one of the plurality of motions according to a state of the character and the motion information;
        wherein before performing the plurality of motions with the character in the environment set by the simulator, further comprising:
            determining whether a number of data points in the training dataset exceeds a threshold;
            when the number of data points does not exceed the threshold, checking if the character is in a reset condition;
            when the character is in the reset condition, resetting the character to an initial state;
            when the character is not in the reset condition, using the policy model to output one of the plurality of motions according to the state of the character and the motion information; and
            performing the plurality of motions with the character in the environment set by the simulator;
        wherein collecting the plurality of data points when the character performing the plurality of motions comprises:
            computing a reward for each of the plurality of motions performed by the character; and
            storing a training data in the training dataset, wherein the training data comprises the state, the reward, each of the plurality of motions, and a resulting state after the character performs each of the plurality of motions.

2. The animation processing method of claim 1, wherein the character file is unified robot description format.

3. The animation processing method of claim 1, wherein generating the motion file according to the character file and the plurality of keyframes comprises:

performing an interpolation according to the character file and the plurality of keyframes to generate the motion file.

4. The animation processing method of claim 1, wherein the motion information comprises a rotation angle of each joint of the character, a three-dimensional coordinate of a center of mass of the character, and a three-axis angle of the center of mass.

5. The animation processing method of claim 1, wherein the environment set by the simulator comprises gravity, ground friction, and external disturbances.

6. The animation processing method of claim 1, wherein the simulator is Isaac Gym simulator.

7. The animation processing method of claim 1, further comprising:
   determining whether a number of iterations of the training process exceeds a threshold, and
   terminating the training process when the number of iterations exceeds the threshold.

8. The animation processing method of claim 1, wherein the reward comprises a plurality of error terms between the initial state and a target state, and the plurality of error terms comprises a joint position, a joint velocity, an end-effector position, a position of a center of mass and a linear velocity, and an orientation of the center of mass and an angular velocity.

9. The animation processing method of claim 1, wherein checking if the character is in the reset condition comprises:
   checking if the character falls in the environment; and
   checking if a number of the motions exceeds a predetermined value.

* * * * *